(12) United States Patent
Kim et al.

(10) Patent No.: US 12,327,897 B2
(45) Date of Patent: Jun. 10, 2025

(54) OPERATION CONTROLLER OF FUEL CELL AND OPERATION CONTROL METHOD THEREOF

(71) Applicants: Hyundai Motor Company, Seoul (KR); Kia Corporation, Seoul (KR)

(72) Inventors: Jong Gyun Kim, Yongin-si (KR); Jae Won Jung, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 692 days.

(21) Appl. No.: 17/528,583

(22) Filed: Nov. 17, 2021

(65) Prior Publication Data

US 2022/0359897 A1 Nov. 10, 2022

(30) Foreign Application Priority Data

May 4, 2021 (KR) .................. 10-2021-0057961

(51) Int. Cl.
*H01M 8/04955* (2016.01)
*H01M 8/04537* (2016.01)

(52) U.S. Cl.
CPC ... *H01M 8/04955* (2013.01); *H01M 8/04626* (2013.01); *H01M 2250/20* (2013.01)

(58) Field of Classification Search
CPC ......... H01M 8/04955; H01M 8/04626; H01M 2250/20; B60L 58/13; B60L 2240/12; B60L 2240/26; B60L 2240/421; B60L 2240/642; B60L 2250/18; B60L 58/40
See application file for complete search history.

(56) References Cited

U.S. PATENT DOCUMENTS

2004/0048118 A1* 3/2004 Nakaji .................... B60L 58/33
429/429
2010/0009219 A1 1/2010 Kwon et al.

FOREIGN PATENT DOCUMENTS

KR 10-1000703 B1 12/2010

* cited by examiner

*Primary Examiner* — Adam A Arciero
(74) *Attorney, Agent, or Firm* — Morgan, Lewis & Bockius LLP

(57) ABSTRACT

An operation controller of a fuel cell and an operation control method thereof in a system for generating a drive output through a fuel cell and a battery includes a processor for selectively performing a driving stop control of the fuel cell through an operation variable including a required drive output and a load weight.

10 Claims, 3 Drawing Sheets

OPERATION CONTROLLER OF FUEL CELL AND OPERATION CONTROL METHOD THEREOF

CROSS REFERENCE TO RELATED APPLICATION

The present application claims the benefit of priority to Korean Patent Application No. 10-2021-0057961 filed on May 4, 2021 in the Korean Intellectual Property Office, the entire contents of which is incorporated herein for all purposes by this reference.

BACKGROUND

Technical Field

The present disclosure relates to an operation controller of a fuel cell and an operation control method of a fuel cell, and more particularly, to an operation controller of a fuel cell and an operation control method of a fuel cell, which are capable of controlling outputs of a fuel cell and a battery by reflecting an internal state of a vehicle through operation variables such as a load weight and the like of the vehicle instead of using only a required drive output of the fuel cell in controlling the vehicle and application to which a fuel cell system and a battery system are applied, and thus increasing fuel efficiency of the vehicle and durability of a fuel cell stack.

Description of the Related Art

In a vehicle to which a fuel cell (FC) system and a battery system are applied, when a state of charge (SOC) of a battery is greater than or equal to a predetermined level due to battery charging while the fuel cell system is operating, an FC stop, that is, a driving stop control function (a state in which, while the vehicle is traveling, a supply of hydrogen or air to an FC stack is interrupted and driving of the vehicle is possible using only an output of the battery) is performed, and thus it is possible to achieve an effect of fuel efficiency improvement. However, due to a high load (high weight) and a long-distance traveling, in order to secure a cruising range of a commercial vehicle, the SOC should be maintained to be high. Therefore, when the SOC is greater than or equal to a predetermined level and a required output of the vehicle is low, instead of performing the driving stop control function, the fuel cell system employs a strategy for keeping the SOC high by always operating the fuel cell system through low-output driving control (a state of lowering an air flow rate to intentionally use the FC stack at low efficiency) of the fuel cell system which can charge only the battery.

However, when the low-output driving control of the fuel cell system is applied to the commercial vehicle in a batch, since the fuel cell system is always operated to maintain the SOC, degradation in fuel efficiency and shortening in stack durability occur so that marketability of the vehicle may be degraded. Accordingly, there is a need to selectively perform the low-output driving control by reflecting a state of the commercial vehicle.

The foregoing is intended merely to aid in understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an operation controller of a fuel cell and an operation control method of a fuel cell, which are capable of controlling outputs of a fuel cell and a battery by reflecting an internal state of a vehicle through operation variables such as a load weight and the like of the vehicle instead of using only a required drive output of the fuel cell in controlling the vehicle and application to which a fuel cell system and a battery system are applied, and thus increasing fuel efficiency of the vehicle and durability of a fuel cell stack.

According to one aspect, there is provided an operation controller for controlling an operation of a fuel cell in a system for generating a drive output through a fuel cell and a battery, the operation controller including a processor configured to selectively perform a driving stop control of the fuel cell through an operation variable including a required drive output and a load weight.

When a state of charge (SOC) of the battery is greater than or equal to a first reference value, the processor may selectively perform the driving stop control of the fuel cell through the operation variable, and when the SOC of the battery is less than the first reference value, the processor may perform a normal output control of the fuel cell.

When the required drive output is less than or equal to a first output, the processor may perform the driving stop control, and when the required drive output exceeds the first output, the processor selectively may perform the driving stop control of the fuel cell through the operation variable.

When the required drive output exceeds the first output and the load weight is less than or equal to a first weight, the processor may perform the driving stop control, and when the required drive output exceeds the first output and the load weight exceeds the first weight, the processor may perform the normal output control.

When the required drive output exceeds the first output and is less than the second output, the processor may selectively perform the driving stop control of the fuel cell through the operation variable, and when the required drive output is greater than or equal to the second output, the processor may perform the normal output control.

When the required drive output exceeds the first output and is less than the second output and the load weight is less than or equal to the first weight, the processor may perform the driving stop control, and when the required drive output exceeds the first output and is less than the second output and the load weight exceeds the first weight, the processor may perform the normal output control.

The processor may selectively perform the driving stop control and a low-output driving control of the fuel cell through the operation variable.

The processor may perform the low-output driving control, and then when the SOC of the battery is greater than or equal to a second reference value, the processor may perform the driving stop control.

When the required drive output is greater than or equal to the second output, the processor may perform the low-output driving control, and when the required drive output is less than the second output, the processor may selectively perform the driving stop control of the fuel cell through the operation variable.

When the required drive output is less than the second output and the load weight is less than or equal to the first weight, the processor may perform the driving stop control, and when the required drive output is less than the second output and the load weight exceeds the first weight, the processor may perform the low-output driving control.

When the required drive output exceeds the first output and is less than the second output, the processor may selectively perform the driving stop control of the fuel cell through the operation variable, and when the required drive output is less than or equal to the first output, the processor may perform the driving stop control.

When the required drive output exceeds the first output and is less than the second output and the load weight is less than or equal to the first weight, the processor may perform the driving stop control, and when the required drive output exceeds the first output and is less than the second output and the load weight exceeds the first weight, the processor may perform the low-output driving control.

According to another aspect, an operation control method of a fuel cell according to the present disclosure in a system for generating a drive output through a fuel cell and a battery includes receiving a required drive output, receiving a load weight, and selectively performing a driving stop control of a fuel cell through an operation variable including a required drive output and the load weight.

In the receiving of the required drive output, the required drive output and a state of charge (SOC) of the battery may be input; and the selectively performing of the driving stop control of the fuel cell includes selectively performing the driving stop control of the fuel cell through the operation variable when the SOC of the battery is greater than or equal to a first reference value, and performing a normal output control of the fuel cell when the SOC of the battery is less than the first reference value.

In the selectively performing of the driving stop control of the fuel cell, the driving stop control and a low-output driving control of the fuel cell may be selectively performed through the operation variable.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Specific structural and functional descriptions of the embodiments of the present disclosure disclosed in this disclosure or application are illustrative only for the purpose of describing the embodiments according to the present disclosure, and the embodiments according to the present disclosure may be implemented in various forms and should not be construed as being limited to embodiments described in this disclosure or application. Hereinafter, exemplary embodiments of the present disclosure will be described in detail with reference to the accompanying drawings.

Figure 1:
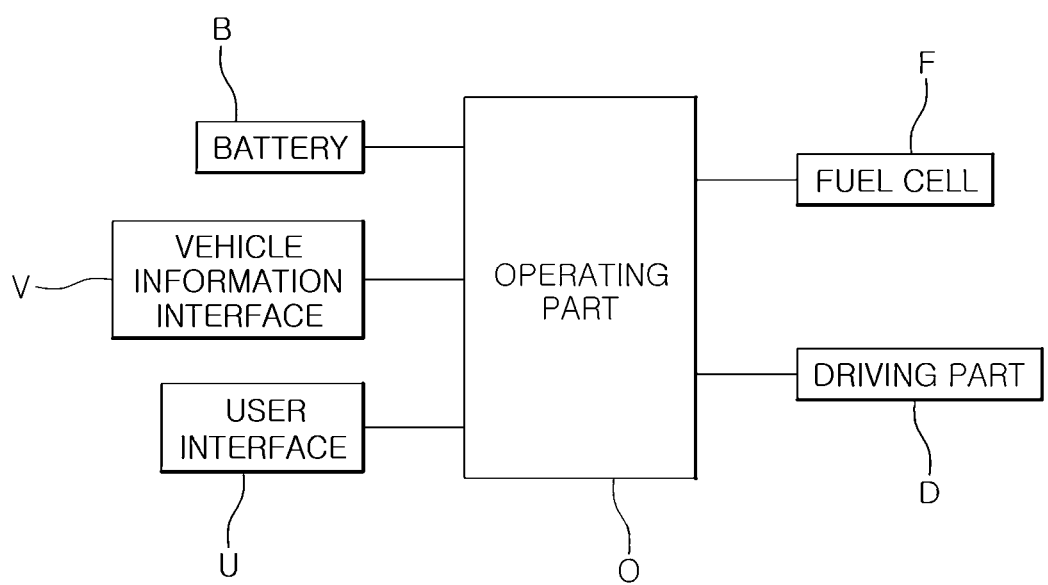
FIG. 1 is a block diagram illustrating an operation controller of a fuel cell according to one exemplary embodiment of the present disclosure.
Figure 2:
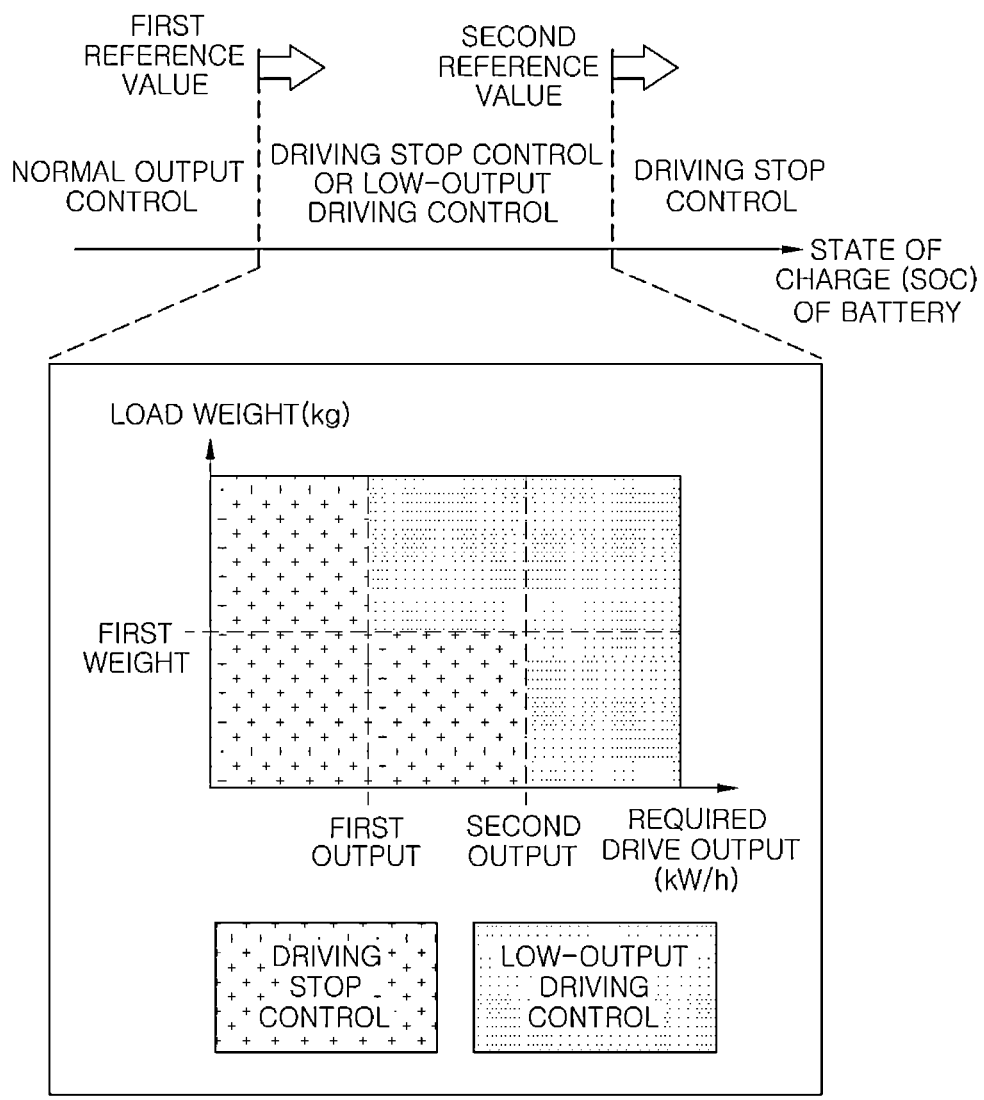
FIG. 2 is a diagram illustrating an operating mechanism of the operation controller of the fuel cell according to one exemplary embodiment of the present disclosure.
Figure 3:
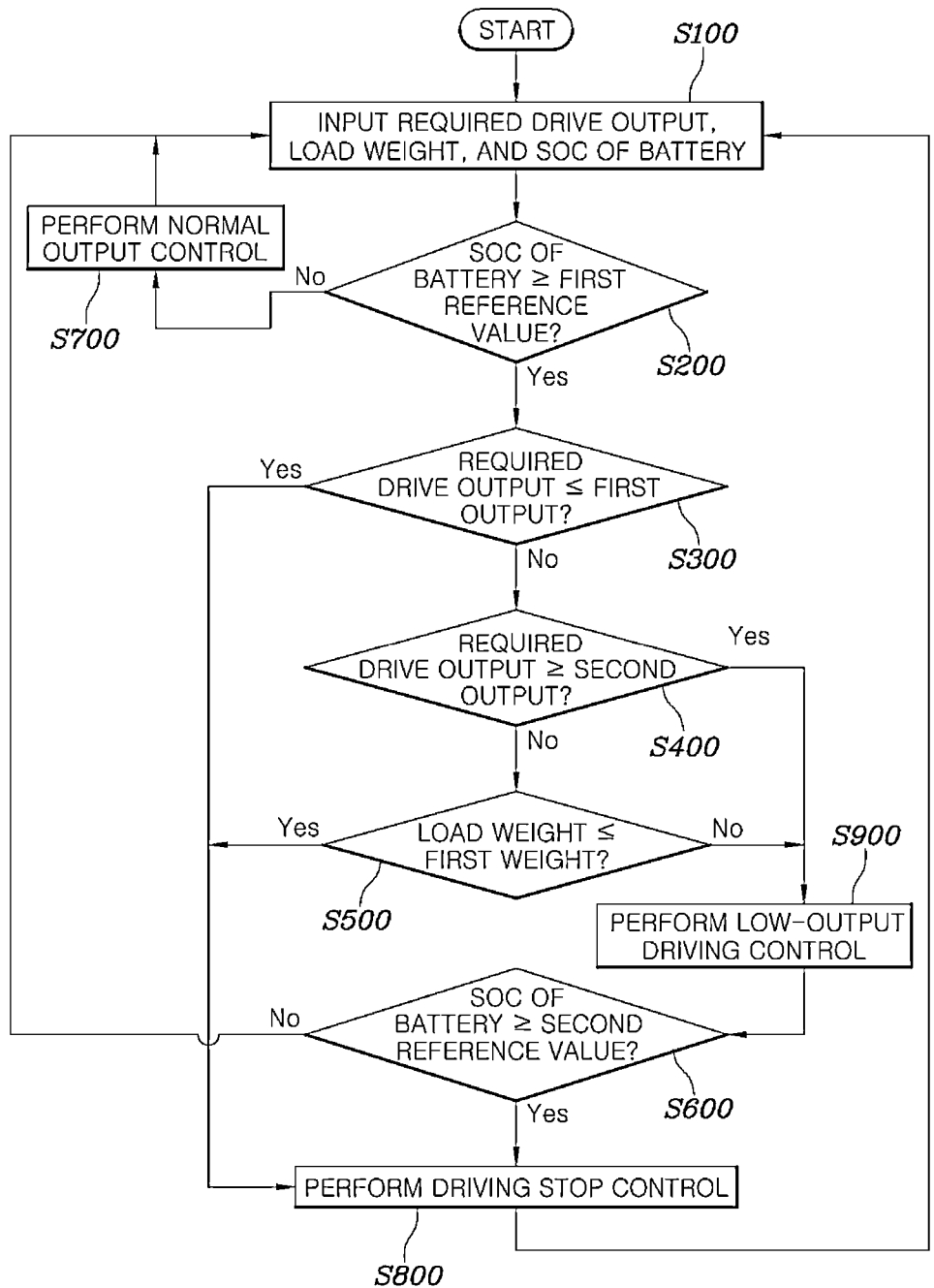
FIG. 3 is a flowchart illustrating an operation control method of a fuel cell according to one exemplary embodiment of the present disclosure.

FIG. 1 is a block diagram illustrating an operation controller of a fuel cell according to one exemplary embodiment of the present disclosure, FIG. 2 is a diagram illustrating an operating mechanism of the operation controller of the fuel cell according to one exemplary embodiment of the present disclosure, and FIG. 3 is a flowchart illustrating an operation control method of a fuel cell according to one exemplary embodiment of the present disclosure.

FIG. 1 is a block diagram illustrating the operation controller of a fuel cell according to one exemplary embodiment of the present disclosure, and the operation controller of a fuel cell is a higher level system which receives information on a vehicle and an application (hereinafter referred to as the vehicle and the like) to limit an output of the fuel cell or control an operation thereof. In particular, as in one exemplary embodiment of the present disclosure, in the case of a system for controlling driving of a motor through a fuel cell F and a battery B, an operation part O receives, as operation variables that are information on the vehicle, a battery state of charge (SOC), a minimum battery SOC, and an output limit value from the battery B, vehicle information such as a vehicle speed and a gear shift and a load weight (gross vehicle weight−vehicle weight) or a load weight ratio (load weight/gross vehicle weight) from a vehicle information interface V, and a required drive output from a user interface U. The operation part O calculates an output of the battery B and an output of the fuel cell F on the basis of the operation variables input from the above devices and converts the outputs into signals through a fuel cell direct current (DC)-DC converter (FDC) and a fuel cell output converter to finally control an operation of the fuel cell F. A driving part D drives the vehicle through a motor according to the outputs of the fuel cell F and the battery B, which are controlled as described above.

The battery B of the present disclosure may include a high voltage battery which provides electric energy for driving a driving motor of the vehicle. An SOC of the battery B may be measured as a ratio of a maximum charging capacity to a current charging capacity, which is converted into a measured value through an instantaneous current-voltage of hardware or a predicted value through battery software (BMS). In addition, the load weight input from the vehicle information interface V may be derived by calculating a force currently applied to the vehicle according to the driving information of the vehicle, that is, a vehicle speed, a revolution per minute (RPM) which is a rotating force of an engine, and a gear shift state (the number of gears). Alternatively, the load weight may be measured by installing a load cell or a hydraulic meter in a device inside the vehicle or attaching a separate sensor, such as an air sensor, an inclination sensor, a deformation sensor, or a positioning sensor, to the vehicle. In addition, the user interface U is a device through which a driver requests for acceleration or deceleration and includes an accelerator pedal, a brake pedal, a voice recognition interface, sensor fusion, wearable-computing, a brain-computer interface, and various input parts. The user interface U may receive a driver's request for acceleration and deceleration, convert the driver's request into a required drive output which is required by the system, and provide the required drive output.

The present disclosure relates to a technology for a control system which generates drive outputs through the fuel cell F and the battery B. In order to overcome performance degradation due to the use of a fuel cell, the existing control system applied to a vehicle equipped with a large-capacity battery performs control using the above operation variables, variables which are measured by other devices (a thermal management device, an air and fuel supply device, and a fuel storage device) and vary in real time, or a relational expression with the operation variables and the variables. In particular, the existing control system may dynamically or statically control the above parameters (generally, a maximum output of the fuel cell among the above parameters) to not exceed a predetermined level (normal output control). In this case, although it is possible to ensure a high load request of the vehicle and acceleration performance desired by the driver, it is preferable to control the fuel cell to maintain a predetermined output or less for a certain period of time so as to improve durability of the fuel cell.

Therefore, in order to prevent durability degradation of the fuel cell, the existing control system commonly prioritizes to drive the vehicle using the output of the battery instead of the output of the fuel cell or, to this end, limits the output of the fuel cell so as to not maintain a high output of the fuel cell. In the former case, when the SOC of the battery is greater than or equal to a predetermined level, the existing control system may be controlled in a state of driving stop control (fuel cell stop (FCS) mode) in which the vehicle is driven using only the output of the battery and a supply of hydrogen or air to the fuel cell is completely interrupted. In this case, since the output of the battery is concentrated on an output required for driving the vehicle, an effect of improving fuel efficiency and preventing durability degradation may be simultaneously achieved. In the latter case, the existing control system may lower a supply of hydrogen or air to the fuel cell until the SOC of the battery reaches a predetermined level to control the output of the fuel cell to be less than or equal to a predetermined output for a certain period of time (low-output driving control). In this case, since outputs of auxiliary devices (an air blower, a hydrogen recirculation blower, a water pump, and the like) of the fuel cell become greater than an output required for driving the vehicle, fuel efficiency is reduced when compared to the FCS mode, and thus a durability period of the fuel cell is reduced.

However, the existing technology for controlling the output of the fuel cell using only the SOC of the battery regardless of a state of the vehicle excessively induces the latter low-output driving control or the normal output control which prevents performance degradation of the fuel cell. That is, the existing control system performs the low-output driving control on the fuel cell only because the SOC of the battery is less than or equal to the predetermined level even in a state in which a load weight is low. Alternatively, the existing control system performs the normal output control on the fuel cell only because the SOC of the battery is greater than or equal to the predetermined level even though high power is not required by the vehicle. The above two cases degrade fuel efficiency and do not prevent durability degradation of the fuel cell. In addition, the above two cases excessively depend on the control of peripherals (balance of plants (BOPs)) of the battery and the fuel cell. As a result, the BOPs are excessively controlled or the battery is excessively charged or discharged so that a state of health (SOH) thereof may be significantly degraded.

Thus, it is preferable that a control system for generating a drive output through the fuel cell and the battery reflects the state of the vehicle to control the driving of the fuel cell. Therefore, the present disclosure is a technology for controlling the output of the fuel cell through a parameter reflecting the state of the vehicle. Consequently, it is possible to improve fuel efficiency of the vehicle, increase durability of the fuel cell, and improve performance states of the peripherals of the battery and the fuel cell.

FIG. 1 is a block diagram illustrating the operation controller of a fuel cell according to one exemplary embodiment of the present disclosure. Specifically, in a system for generating a drive output through the fuel cell F and the battery B, an operation controller for controlling an operation of the fuel cell F according to an exemplary embodiment of the present disclosure may be a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed by the processor, provides the functionalities of an operation part O for selectively performing driving stop control on the fuel cell F through an operation variable including a required drive output and a load weight.

According to one exemplary embodiment of the present disclosure, the required drive output and the load weight are used as indicators for evaluating a state of a vehicle. The required drive output of the vehicle is a value obtained by converting a request for acceleration/deceleration by a driver, which is received through the user interface U, into an output required in the entire system of the vehicle. In particular, in one exemplary embodiment of the present disclosure, the required drive output may be set within a predetermined range ($\pm\alpha$) with respect to a value, which varies in real time, so as to actively reflect the request of the driver and may be set to a movement average output for a certain period of time so as to allow control for selectively performing an FCS mode of the fuel cell F to be more stable.

The required drive output of the vehicle, which is determined as described above, is an output required in the entire system, wherein the required drive output is distinguished from each of an output of the fuel cell F and an output of the battery B. Therefore, when compared with the control of the fuel cell F through each of the output of the fuel cell F and the output of the battery B, wherein the control simply evaluates an overspeed traveling state or a low-speed traveling state of the vehicle according to the request for acceleration/deceleration by the driver, the driving stop control is quickly and accurately performed to prevent durability degradation of the fuel cell F, the battery B, and the peripherals of the fuel cell F and the battery B. That is, in one exemplary embodiment of the present disclosure, when it is determined that a load state of the entire system of the vehicle is small, the control according to the required drive output may quickly switch to the FCS mode to achieve an improvement effect of fuel efficiency and durability of the entire system of the vehicle.

In addition, the control of the fuel cell through a load weight, that is, a value obtained by subtracting a vehicle weight from a current gross weight of the vehicle may increase durability of the fuel cell by more appropriately considering the vehicle itself and an external use environment of the vehicle. Vehicles which are expected to have high load weights, such as commercial vehicles, trams, and ships, are equipped with separate control systems or devices to prevent low fuel efficiency due to low load weights with respect to BOPs of fuel cells and instability and the risk of damage of the vehicle. For example, for preparing for a case in which the load weight is high, the battery of the vehicle may be controlled to maintain a predetermined SOC of the battery or more, a thermal management device may be controlled to be lower than or equal to a predetermined cooling water temperature, or a hydrogen storage device may be controlled to store a predetermined amount of hydrogen or more. However, the load weight may be lowered according to the use environment of the vehicle, and even in such a case, maintaining the output of the fuel cell continuously not only degrades durability of the fuel cell but also causes excessive control of the BOPs of the fuel cell. That is, although the load weight of the vehicle is low, in a state in which the load weight is determined as being high, the output of the fuel cell is continuously maintained to be low, and a state of the cooling water temperature and a hydrogen amount state of the hydrogen storage device are also continuously measured and determined, and thus excessive resource is put into the entire system. Therefore, according to one exemplary embodiment of the present disclosure, the control of the fuel cell through the load weight prevents the above problems and accurately and quickly switches to the FCS mode, thereby increasing durability of the vehicle and stability in relation to the BOPs.

Consequently, according to one exemplary embodiment of the present disclosure, the control is performed through the operation variable including the required drive output and the load weight of the vehicle, and thus a load of an internal system of the vehicle is reflected and, simultaneously, a load due to an external system according to the use environment of the vehicle is reflected so that the driving stop control of the fuel cell may be selected. With the above description, the durability of the fuel cell may be secured, the fuel efficiency of the vehicle may be improved, and the vehicle may be operated more stably in relation to the fuel cell, the BOPs of the fuel cell, and the battery.

FIG. 2 is a diagram illustrating an operating mechanism of the operation controller of the fuel cell according to one exemplary embodiment of the present disclosure. Specifically, when the SOC of the battery is greater than or equal to a first reference value, the operation part O may selectively perform the driving stop control of the fuel cell through the operation variable, and when the SOC of the battery is less than the first reference value, the operation part O may perform the normal output control on the fuel cell.

Here, the normal output control is a system for dynamically or statically limiting real-time parameters measured from the fuel cell and the battery or the BOPs of the fuel cell and the battery and sensors installed in the BOPs from exceeding predetermined levels before a starting of the vehicle or from the start of traveling to a termination state of the traveling and driving. For example, assuming a system in which a controller dynamically limits the output of the fuel cell. In a normal state (which is a state before driving of the vehicle or in which a recovery time is sufficiently given as before the starting or the start of traveling), the output of the fuel cell is limited to 100 kW or less, and when the cooling water temperature rises or the SOC of the battery is insufficient, a reference may be lowered by continuously varying to 90 kW, 80 kW, or the like in proportion to or corresponding to the cooling water temperature or the SOC of the battery. As described above, the dynamic limiting system may harmonize the request for acceleration/deceleration by the driver with the resulting performance degradation by linking the real-time parameters to output control.

For example, assuming a system in which a controller statically limits the output of the fuel cell. Here, when the above situation occurs at the 100 kW output of the fuel cell in the normal state, instead of being in proportion to or corresponding to the above parameter, the output of the fuel cell may be lowered in batches to 90 kW, 80 kW, or the like until the reference is returned for a certain period of time or returned to the normal state. Therefore, the static limiting system is a control scheme system focusing on improving the durability of the vehicle, instead of the request for acceleration/deceleration by the driver.

Accordingly, the operation controller according to one exemplary embodiment of the present disclosure may be a controller which performs the normal output control and is designed in advance to perform static limiting on a vehicle requiring acceleration/deceleration performance and perform dynamic limiting on a vehicle focusing on durability of the fuel cell. In any case, according to one exemplary embodiment of the present disclosure, the driving stop control is smoothly performed on the premise that the SOC of the battery charge is sufficient. In particular, one exemplary embodiment of the present disclosure in which the driving stop control is selectively performed only on the premise that the SOC of the battery is greater than or equal to the first reference value is characterized to be universally applicable to all systems which generate a drive output through the fuel cell and the battery.

In addition, the first reference value of the SOC of the battery may be determined as a point at which the fuel efficiency of the entire system of the vehicle is maximized in a state in which the fuel cell performing the normal output control is operated in a state of the SOC of the battery that is less than the first reference value. The first reference value is an extended value of a trend line such as a linear regression or a curve fitting on the basis of experimentally or previously measured values and may be determined through a simulation in a state in which a current output, which is the highest efficiency point of the fuel cell, is fixed. In addition, when a corresponding vehicle requires more the durability of the fuel cell than the fuel efficiency of the system, the first reference value may be redesigned according the requirement.

Specifically, when the required drive output is less than or equal to a first output, the operation part O of FIG. 2 performs the driving stop control, and when the required drive output exceeds the first output, the operation part O selectively performs the driving stop control of the fuel cell through the operation variable. That is, when the vehicle is maintained in a low load state, the fuel cell may switch to a driving stop control mode. Here, similar to the first reference value, when the driving stop control is performed in a condition below the first reference value, the first output is a point at which the fuel efficiency of the entire system of the vehicle is maximized or a point harmonizing with durability suitable for a corresponding vehicle and may be determined through measurement, prediction, or a simulation or the like. Therefore, the selective performing of the driving stop control through the required drive output determined as described above may promote an effect of improving the fuel efficiency and the durability of the entire system of the vehicle.

In addition, when the required drive output exceeds the first output and the load weight is less than or equal to a first weight, the operation part O of FIG. 2 may perform the driving stop control, and when the required drive output exceeds the first output and the load weight exceeds the first weight, the operation part O may perform the normal output control. (Note: the above description is one of the embodiments in which the low-output driving control of FIG. 2 is changed to the normal output control.) In other words, a fuel cell in a vehicle of which a load weight is reduced to a predetermined level or less may be switched to the driving stop control mode. For example, considering a case in which a vehicle transports cargo, when the vehicle loads cargo, the normal output control is performed, and the driving stop control is performed after unloading of the cargo. In this case, when the cargo is loaded, even when the SOC of the battery is greater than or equal to the first reference value, the normal output control is performed to exhibit acceleration performance of the vehicle so that it is possible to respond to a high load state. In addition, after the unloading of the cargo, since the SOC of the battery is greater than or equal to the first reference value, the driving stop control is performed to improve fuel efficiency and durability of the fuel cell.

Here, the first weight may be determined as a predetermined ratio of a weight that a corresponding vehicle can load at maximum. In particular, a maximum load weight of a vehicle which should be secured to have a high cruising range is determined according to a cruising range regardless of a legal maximum loading limit. Accordingly, on the basis of the above description, like the aforementioned first reference value, the first weight may be determined as a point at which the fuel efficiency of the entire system is maximized or a point harmonizing with the durability.

The selective performing of the driving stop control through the load weight determined as described above may enhance fuel efficiency when loading of loads, prevent durability degradation of the fuel cell, and properly charge the battery, thereby maintaining an SOH of the fuel cell. In addition, according to one exemplary embodiment of the present disclosure, it is possible to prevent excessive control of the BOPs of the fuel cell, which is generated by not considering the load weight even after unloading of the loads, thereby stabilizing the entire system applied to the vehicle.

In addition, when the required drive output exceeds the first output and is less than a second output, the operation part O of FIG. 2 may selectively perform the driving stop control of the fuel cell through the operation variable, and when the required drive output is greater than or equal to the second output, the operation part O may perform the normal output control. (Note: the above description is one of the embodiments in which the low-output driving control of FIG. 2 is changed to the normal output control.) That is, the operation part O may set an optimal required drive output section to switch to a driving control mode of the fuel cell or perform the normal output control. This prevents a reduction in the SOC of the battery, which is hidden by the required drive output that produces the highest efficiency of the system of the vehicle. A setting criterion of the above described first output may be an output at the highest efficiency point of the system of the vehicle. However, in a state in which the required drive output of the system is high, that is, in a high load state, the SOC of the battery in the vehicle is rapidly decreased enough to not be able to maintain a state of the FCS mode. Accordingly, in the case of high-output driving using only the fuel cell, fuel efficiency and durability of the vehicle are inevitably degraded. In this case, it is desirable in terms of system stability to selectively control the FCS mode when the required drive output is less than an output value at which the SOC of the battery is maintained and to quickly switch to a state of the normal output control of the fuel cell when the required drive output exceeds the output value. Accordingly, the second output is an output value at which the SOC of the battery is maintained even in the state of the normal output control of the fuel cell and may be determined through measurement, prediction, or simulation. The embodiment of the present disclosure that sets sections of the second output and the first output, which are determined as described above, is a system capable of securing stability of the driving stop control and quickly responding to a high load environment of the vehicle.

Lastly, when the required drive output exceeds the first output and is less than the second output and the load weight is less than or equal to the first weight, the operation part O of FIG. 2 may perform the driving stop control, and when the required drive output exceeds the first output and is less than the second output and the load weight exceeds the first weight, the operation part O may perform the normal output control. (Note: the above description is one of the embodiments in which the low-output driving control of FIG. 2 is changed to the normal output control.) In other words, a fuel cell in a vehicle, of which a load weight is reduced to a predetermined level or less in a predetermined section of the required drive output, may be switched to the driving stop control mode. Therefore, only when a load at a level at which the SOC of the battery is maintained is applied to the vehicle, the driving stop control may be performed through the load weight to further achieve stability of the entire system.

In particular, a maximum load weight of a vehicle which should be secured to have a high cruising range is determined according to a cruising range regardless of a legal maximum loading limit. Accordingly, on the basis of the above description, like the aforementioned first reference value, the first weight may be determined as a point at which the fuel efficiency of the entire system is maximized or a point harmonizing with the durability. Thus, the selective performing of the driving stop control through the load weight determined as described above may enhance fuel efficiency, prevent durability degradation of the fuel cell, and properly charge the battery, thereby maintaining an SOH of the fuel cell. In addition, according to one exemplary embodiment of the present disclosure, it is possible to prevent excessive control of the BOPs of the fuel cell, which is generated by not considering the required drive output and the load weight together, thereby stabilizing the entire system applied to the vehicle.

FIG. 2 is a diagram illustrating an operating mechanism of the operation controller of the fuel cell according to one exemplary embodiment of the present disclosure. As another example, the operation part O may selectively perform the driving stop control and the low-output driving control of the fuel cell through the operation variable. That is, instead of the fuel efficiency of the vehicle and the durability of the fuel cell, the operation part O may be operated to preemptively charge the battery according to the vehicle state to prepare the driving stop control of the fuel cell.

Here, the low-output driving control of the fuel cell is to lower a supply of hydrogen or air to the fuel cell until the SOC of the battery reaches a predetermined level to control the fuel cell below a predetermined output for a certain period of time. In this case, the "low output" may be set within a predetermined range (±b) like the above required drive output for the purpose of stability of fuel cell control or may be set as a movement average output for a certain period of time. In addition, the low-output driving control lowers both of an air pressure and a mass flow rate so as to generate a low output of the vehicle, but according to Bernoulli's theorem, the low-output driving control may adjust the air pressure to be slightly high and the mass flow rate to be slightly low at a ratio in which the fuel efficiency is most efficient or vice versa.

In general, when not in the FCS mode, according to the normal output control, that is, a real-time parameter, a maximum output of the fuel cell is statically or dynamically controlled. In the case of the dynamic control, the output of the fuel cell continuously varies, and thus the SOC of the battery also continuously varies. Accordingly, an excessive resource may be put into measuring, determining, and controlling the battery to a predetermined level which is required to drive the FCS mode of the fuel cell. In addition, in the case of the static control, the output of the fuel cell is maintained at a predetermined level, and the predetermined level may be set too high according to an acceleration request by the driver. In this case, the fuel cell cannot execute the FCS mode, and when the normal output control is performed, a decrease in lifetime according to a high discharge rate of the battery becomes severe due to an excessively high constant output. Thus, according to one exemplary embodiment of the present disclosure, a problem caused due to dependence on only the FCS mode and only the normal output control according to the state of the vehicle is solved. That is, according to one exemplary embodiment of the present disclosure in which the driving stop control and the low-output driving control of the fuel cell are selectively performed, the FCS mode may be stably executed in the system for controlling the driving of the motor through the fuel cell and the battery, and thus it is possible to substantially achieve improvement effects of the fuel efficiency of the vehicle and the durability of the fuel cell.

Meanwhile, the operation part O performs the low-output driving control, and then when the SOC of the battery is greater than or equal to a second reference value, the operation part O may perform the driving stop control. In other words, the operation part O may control to quickly switch to the driving stop control of the fuel cell while continuously receiving feedback on the SOC of the battery. Here, the second reference value may be a maximum SOC in which the SOC of the battery does not decrease the SOH of the battery. Overcharging of the battery reduces lifetimes of the battery and the BOP thereof due to exposure of the battery to a high temperature and causes a swelling phenomenon or the risk of fire occurrence. Therefore, according to one exemplary embodiment of the present disclosure, the control of the fuel cell is quickly switched to the FCS mode according to the SOC of the battery, thereby improving the lifetime of the battery and thus achieving the stability of the entire system of the vehicle.

In addition, when the required drive output is greater than or equal to the second output, the operation part O performs the low-output driving control, and when the required drive output is less than the second output, the operation part O selectively performs the driving stop control of the fuel cell through the operation variable. That is, in a high-output section in which the SOC of the battery is not maintained, the operation part O may switch to low-output driving control. As described above, in a high load state of the system of the vehicle, the SOC of the battery is rapidly decreased, and when the FCS mode is not maintained, the fuel efficiency of the vehicle and the durability of the fuel cell are degraded. In this case, unlike the above embodiment in which the control quickly switching to the normal output control is performed, another exemplary embodiment of the present disclosure switches to the low-output driving control. Therefore, according to another exemplary embodiment of the present disclosure, the risk of not switching back to the FCS mode according to the normal output control in the above embodiment can be prevented, and putting excessive resources for searching a switching point can be prevented. Accordingly, even when the acceleration request by the driver is somewhat dissatisfied, the operation part O may perform control by focusing more on satisfying an allowable traveling period required by a corresponding vehicle and the durability of the fuel cell.

In addition, when the required drive output is less than the second output and the load weight is less than or equal to the first weight, the operation part O may perform the driving stop control, and when the required drive output is less than the second output and the load weight exceeds the first weight, the operation part O may perform the low-output driving control. In other words, the operation part O controls to quickly switch from the low-output driving control to the driving stop control according to loading/unloading of cargo of the vehicle or its own weight. In the case of irregular transportation for a short period of time by a drone or single-person mobility among vehicles, it may be preferable to control to switch to the normal output control according to the load weight. However, in the case of transporting cargo or passengers for a long period of time on a regular basis by commercial vehicles, aircraft, trams, and ships, it is not preferable to satisfy only the acceleration request by the driver in view of a consumer's request for the allowable traveling period of the vehicle. Therefore, according to another exemplary embodiment of the present disclosure, the low-output driving control is performed when cargo exceeding the first weight is loaded, and the driving stop control is quickly performed after unloading of the cargo so that the fuel efficiency of the vehicle and the durability of the fuel cell are improved and, simultaneously, the needs of special vehicles that require regular and long-term cargo transportation may be further satisfied.

As described above, as a predetermined ratio of a weight which the vehicle is capable of loading cargo at maximum, the first weight refers to a point of the highest efficiency of the system or a point harmonizing with the durability of the fuel cell or the SOH of the battery. However, in one exemplary embodiment of the present disclosure, since the low-output driving control is selectively performed, it is preferable to design the first weight to be lower by focusing more on durability degradation of the fuel cell.

Next, when the required drive output exceeds the first output and is less than the second output, the operation part O may selectively perform the driving stop control of the fuel cell through the operation variable, and when the required drive output is less than or equal to the first output, the operation part O may perform the normal output control. Here, like the above description, the first output may be an output at the point of the highest efficiency of the system of the vehicle. Alternatively, the first output may be set within the predetermined section (±a) for the purpose of stability of the control or may be set as a movement average output for a certain period of time. That is, the operation part O controls whether to perform the driving stop control on only a load of the vehicle within an optimal required drive output section.

For example, when the required drive output of the vehicle is high, which exceeds the first output and is less than the second output, since the required drive output is less than the second output, the SOC of the battery of the vehicle is maintained at a constant level. In this case, it is preferable for a future FCS mode that the vehicle allows the battery to accommodate dynamics of the required drive output as much as possible and allows the fuel cell to accommodate a portion of the dynamics of the required drive output so as to bear a variation of a vehicle state due to the load weight. In contrast, when the required drive output is less than the first output, the SOC of the battery may be raised beyond being maintained the constant level. Therefore, this case is a case in which the required drive output is low, and with respect to a vehicle traveling at a constant speed or decelerating a speed, it is preferable, in terms of durability of the fuel cell, to allow the battery to accommodate the required drive output at maximum instead of the fuel cell partially accommodating the variation of the vehicle state. Thus, according to one exemplary embodiment of the present disclosure which sets such an optimal section and performs control, the driving stop control of the fuel cell is maximally operated according to a battery environment so that the durability of the fuel cell and an allowable traveling time of the vehicle may be maximized.

Lastly, when the required drive output exceeds the first output and is less than the second output and the load weight is less than or equal to the first weight, the operation part O may perform the driving stop control, and when the required drive output exceeds the first output and is less than the second output and the load weight exceeds the first weight, the operation part O may perform the low-output driving control. That is, the operation part O of the present embodiment performs selective control of the driving stop control and the low-output driving control through the load weight only within the above optimal section of the required drive output. For example, assuming that a weight of cargo loaded on a corresponding vehicle is too small. In this case, even though a vehicle passes through an inclined road to enter a high-output section, since the vehicle is smoothly driven using only the battery, it is preferable to not perform the low-output driving control. On the other hand, assuming that the weight of the cargo is too high, driving performed using only the battery causes a problem in performing the driving stop control in the future due to a decrease in SOC of the battery. Therefore, it is preferable to allow the operation part O to quickly perform only the low-output driving control. Therefore, according to one exemplary embodiment of the present disclosure, both a load of an internal system of the vehicle and an external load according to a use environment are taken into consideration, and when the SOC of the battery is maintained, the operation part O is controlled to perform the driving stop control as much as possible. Accordingly, the operation part O is controlled to exhibit the effect of improving the fuel efficiency of the vehicle and the durability of the fuel cell according to internal and external environments through the FCS mode.

FIG. 3 is a flowchart illustrating an operation control method of a fuel cell according to one exemplary embodiment of the present disclosure. The operation control method of a fuel cell according to the present disclosure in a system for generating a drive output through a fuel cell and a battery may include receiving a required drive output and a load weight (S100), and selectively performing driving stop control (S800) of the fuel cell through an operation variable including the required drive output and the load weight (S200 to S600).

More specifically, in the operation control method according to one exemplary embodiment of the present disclosure, when a starting of a vehicle is performed or the vehicle starts traveling, information on the vehicle is input as an operation variable in an initial operation (S100). The information is basically the required drive output of the system, a driver requests acceleration/deceleration or a gear shift of the vehicle through an accelerator pedal, and thus in operation S100, the required drive output required for the entire system is calculated and input. In operation S100, an SOC of the battery and a load weight may be input as other information. Next, whether the required drive output is less than or equal to a first output is determined (S300), and whether the required drive output is less than a second output is determined (S400). Subsequently, the driving stop control of the fuel cell is finally performed (S800). In addition, in this operation, normal output control (S700) of the fuel cell or low-output driving control (S900) of the fuel cell may be selectively performed through the operation variable including the required drive output.

Thus, in the operation control method according to one exemplary embodiment of the present disclosure, the control is performed through the operation variable including the required drive output and the load weight of the vehicle, and thus a load of an internal system of the vehicle is reflected and, simultaneously, a load due to an external system according to the use environment of the vehicle is reflected so that the driving stop control of the fuel cell may be selected. With the above description, the durability of the fuel cell may be secured, the fuel efficiency of the vehicle may be improved, and the vehicle may be operated more stably in relation to the fuel cell, the BOPs of the fuel cell, and the battery.

In addition, in the receiving of the required drive output (S100), the required drive output and the SOC of the battery are input. In the selectively performing of the driving stop control (S800) of the fuel cell through the operation variable including the required drive output and the load weight (S200 to S600), when the SOC of the battery is greater than or equal to a first reference value, the driving stop control of the fuel cell may be selectively performed through the operation variable (S200), and when the SOC of the battery is less than the first reference value, the normal output control (S700) of the fuel cell may be performed. Next, only when the SOC of the battery is greater than or equal to the first reference value, whether the required drive output is less than or equal to the first output is determined (S300), and whether the required drive output is less than the second output is determined (S400). Lastly, the normal output control (S700) of the fuel cell or the low-output driving control (S900) of the fuel cell may be selectively performed through the operation variable including the required drive output.

Accordingly, the operation control method according to one exemplary embodiment of the present disclosure may be the normal output control which is designed in advance to perform static limiting on a vehicle requiring acceleration/deceleration performance and perform dynamic limiting on a vehicle focusing on durability of the fuel cell. In any case, according to one exemplary embodiment of the present disclosure, the driving stop control is smoothly performed on the premise that the SOC of the battery is sufficient. In particular, one exemplary embodiment of the present disclosure in which the driving stop control is selectively performed only on the premise that the SOC of the battery is greater than or equal to the first reference value is characterized to be universally applicable to all systems which generate a drive output through the fuel cell and the battery.

Finally, in the selectively performing of the driving stop control (S800) of the fuel cell (S200 to S600), the driving stop control (S800) and the low-output driving control (S900) of the fuel cell may be selectively performed through the operation variable. As an initial operation, the load weight and the SOC of the battery may be input together with the required drive output of the like of the vehicle (S100). Accordingly, the determining of whether the SOC of the battery is greater than or equal to the first reference value (S200) may be performed. Next, only when the SOC of the battery is greater than or equal to the first reference value, the operation part O may perform the determining of whether the required drive output is greater than or equal to the first output (S300) or the determining of whether the required drive output is greater than or equal to the second output (S400). In particular, when it is determined that the required drive output is greater than or equal to the second output, the low-output driving control (S900) of the fuel cell is performed. In addition, when it is determined that the required drive output exceeds the first output and is less than the second output, the operation part O may perform determining of whether the load weight is less than or equal to a first weight (S500). Next, when it is determined that the load weight is less than or equal to the first weight, the operation part O may perform the driving stop control (S800) of the fuel cell, and when it is determined that the load weight exceeds the first weight, the operation part O may perform the low-output driving control (S900) of the fuel cell. In addition, as a next operation after the low-output driving control (S900) of the fuel cell is performed, when the SOC of the battery is greater than or equal to a second reference value, the operation part O may perform the driving stop control (S800) of the fuel cell.

That is, in the operation control method according to one exemplary embodiment of the present disclosure in which the driving stop control and the low-output driving control of the fuel cell are selectively performed, the FCS mode may be stably executed in the system for controlling the driving of the motor through the fuel cell and the battery, and thus it is possible to substantially achieve improvement effects of the fuel efficiency of the vehicle and the durability of the fuel cell.

In addition, after the performing of the control operations (S700, S800, and S900), each of the control operations (S700, S800, and S900) of the fuel cell may return to receiving the operation variable (S100). In particular, the low-output driving control of the fuel cell may be limited to only the receiving of the SOC of the battery among the operation variables. Thus, according to one exemplary embodiment of the present disclosure, a state of the vehicle and a state of the fuel cell and the battery are fed back so that an appropriate fuel cell control is selectively performed. Consequently, one exemplary embodiment of the present disclosure may respond to preemptively perform the FCS mode according to the internal environment of the vehicle and the external environment such as the load weight, and thus the vehicle may continuously exhibit an effect of improving the fuel efficiency and durability of the fuel cell.

The present disclosure relates to an operation controller of a fuel cell and an operating control method thereof, and more particularly, to an operation controller of a fuel cell and an operating control method thereof, which selectively perform the driving stop control of the fuel cell through the operation variable representing an internal environment of the vehicle and an external environment.

For a vehicle to which a fuel cell system and a battery system are applied, when an SOC is greater than or equal to a predetermined level due to battery charging while the fuel cell system is operating, FC stop, that is, a function of the driving stop control, is performed and thus it is possible to obtain a fuel efficiency improvement effect. However, due to a high load (or a high weight) and a long-distance traveling, in order to secure a cruising range of a commercial vehicle, the SOC should be maintained to be high. Therefore, when the SOC is greater than or equal to a predetermined level and a required output of the vehicle is low, instead of performing the driving stop control function, the fuel cell system employs a strategy for keeping the SOC high by always operating the fuel cell system through low-output driving control of the fuel cell system which can charge only the battery.

However, when the low-output driving control of the fuel cell system is applied to the commercial vehicle in a batch, since the fuel cell system is always operated to maintain the SOC, degradation in fuel efficiency and shortening in stack durability occur so that marketability of the vehicle may be degraded. Accordingly, there is a need to selectively perform the low-output driving control by reflecting a state of the commercial vehicle.

Accordingly, the present disclosure is capable of controlling outputs of the fuel cell and the battery by reflecting the internal state of the vehicle through operation variables such as the load weight and the like of the vehicle instead of using only the required drive output of the fuel cell in controlling the vehicle and application to which a fuel cell system and a battery system are applied, and thus increasing fuel efficiency of the vehicle and durability of a fuel cell stack.

In accordance with an operation controller of a fuel cell and an operation control method thereof according to the present disclosure, which are capable of controlling outputs of a fuel cell and a battery by reflecting an internal state of a vehicle through operation variables such as a load weight and the like of the vehicle instead of using only a required drive output of the fuel cell in controlling the vehicle and application to which a fuel cell system and a battery system are applied, and thus increasing fuel efficiency of the vehicle and durability of a fuel cell stack.

Although the specific embodiments of the present disclosure have been described and illustrated, those skilled in the art will appreciate that various alternations and modifications are possible without departing from the technical spirit of the present disclosure provided in the appended claims.

What is claimed is:

1. An operation controller for controlling an operation of a fuel cell in a system for generating a drive output through a fuel cell and a battery, the operation controller comprising a processor which is configured to:
selectively perform a driving stop control of the fuel cell through an operation variable including a required drive output and a load weight,
wherein:
when the required drive output is less than or equal to a first output, the processor performs the driving stop control of the fuel cell,
when the required drive output is greater than or equal to a second output, the processor performs a normal output control, and
when the required drive output exceeds the first output and is less than the second output, the processor selectively performs the driving stop control or the normal output control of the fuel cell through the operation variable.

2. The operation controller of claim 1, wherein, when a state of charge (SOC) of the battery is greater than or equal to a first reference value, the processor selectively performs the driving stop control of the fuel cell through the operation variable, and when the SOC of the battery is less than the first reference value, the processor performs the normal output control.

3. The operation controller of claim 1, wherein, when the required drive output exceeds the first output and the load weight is less than or equal to a first weight, the processor performs the driving stop control of the fuel cell, and when the required drive output exceeds the first output and the load weight exceeds the first weight, the processor performs the normal output control.

4. The operation controller of claim 1, wherein, when the required drive output exceeds the first output and is less than the second output and the load weight is less than or equal to a first weight, the processor performs the driving stop control of the fuel cell, and when the required drive output exceeds the first output and is less than the second output and the load weight exceeds the first weight, the processor performs the normal output control.

5. The operation controller of claim 1, wherein, the processor selectively performs the driving stop control and a low-output driving control of the fuel cell through the operation variable.

6. The operation controller of claim 5, wherein the processor performs the low-output driving control, and then when a state of charge (SOC) of the battery is greater than or equal to a second reference value, the processor performs the driving stop control of the fuel cell.

7. The operation controller of claim 5, wherein, when the required drive output is greater than or equal to the second output, the processor performs the low-output driving control, and when the required drive output is less than the second output, the processor selectively performs the driving stop control of the fuel cell through the operation variable.

8. The operation controller of claim 7, wherein, when the required drive output is less than the second output and the load weight is less than or equal to a first weight, the processor performs the driving stop control of the fuel cell, and when the required drive output is less than the second output and the load weight exceeds the first weight, the processor performs the low-output driving control.

9. The operation controller of claim 7, wherein, when the required drive output exceeds the first output and is less than the second output, the processor selectively performs the driving stop control of the fuel cell through the operation variable, and when the required drive output is less than or equal to the first output, the processor performs the driving stop control of the fuel cell.

10. The operation controller of claim 9, wherein, when the required drive output exceeds the first output and is less than the second output and the load weight is less than or equal to the first weight, the processor performs the driving stop control of the fuel cell, and when the required drive output exceeds the first output and is less than the second output and the load weight exceeds the first weight, the processor performs the low-output driving control.

* * * * *